United States Patent [19]

Flora et al.

[11] Patent Number: 4,637,018
[45] Date of Patent: Jan. 13, 1987

[54] AUTOMATIC SIGNAL DELAY ADJUSTMENT METHOD

[75] Inventors: Laurence P. Flora, Covina; Michael A. McCullough, Pasadena, both of Calif.

[73] Assignee: Burroughs Corporation, Detroit, Mich.

[21] Appl. No.: 645,934

[22] Filed: Aug. 29, 1984

[51] Int. Cl.⁴ .................. H03K 3/06; G01R 15/12
[52] U.S. Cl. .......................................... 371/1; 328/55
[58] Field of Search ............. 364/200, 900, 569; 375/119, 117; 371/1, 20, 25; 328/55, 56

[56] References Cited

U.S. PATENT DOCUMENTS

| Re. 31,056 | 10/1982 | Chau | 371/1 |
| 3,728,679 | 4/1973 | McIntosh | 371/1 |
| 3,790,954 | 2/1974 | Devore | 371/1 |
| 3,927,392 | 12/1975 | Caron | 371/1 |
| 3,976,940 | 8/1976 | Chau | 371/1 |
| 4,122,995 | 10/1978 | Franke | 371/1 |
| 4,139,147 | 2/1979 | Franke | 371/1 |
| 4,330,750 | 5/1982 | Mayor | 328/55 |
| 4,488,297 | 12/1984 | Vaid | 371/1 |
| 4,490,821 | 12/1984 | Lacher | 371/1 |

Primary Examiner—Michael R. Fleming
Attorney, Agent, or Firm—Nathan Cass; Kevin R. Peterson; Edmund M. Chung

[57] ABSTRACT

A method for automatically adjusting the propagation time delay of an electrical circuit, such as an integrated circuit chip. In a preferred embodiment, the method is employed to de-skew the clock outputs provided by a plurality of clock distribution chips having different signal propagation times. In a preferred implementation of the method, feedback circuitry including a multi-tapped delay line and an accurate constant delay are employed in conjunction with a phase comparator for automatically adjusting the propagation delay of each chip to provide substantially the same constant delay relative to a main system clock for the clock outputs provided by the clock distribution chips.

15 Claims, 8 Drawing Figures

FIG. 3A.
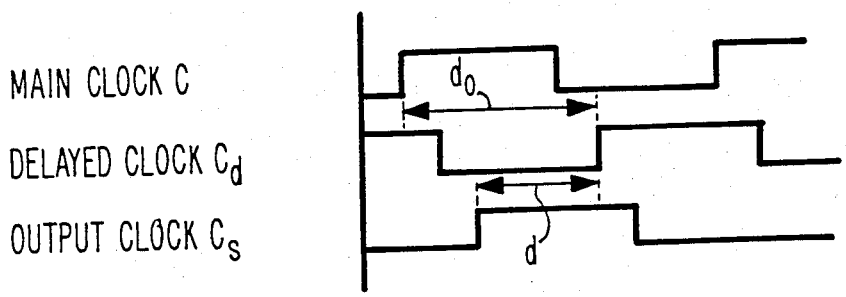
MAIN CLOCK C
DELAYED CLOCK $C_d$
OUTPUT CLOCK $C_s$
FIG. 3B.
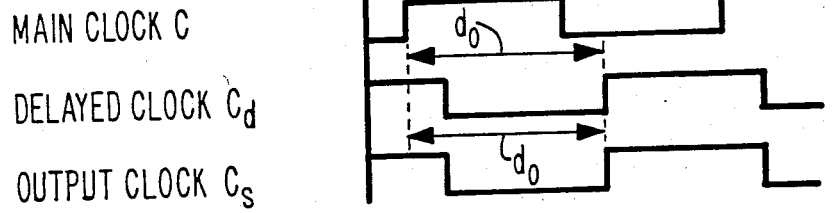
MAIN CLOCK C
DELAYED CLOCK $C_d$
OUTPUT CLOCK $C_s$
FIG. 6.
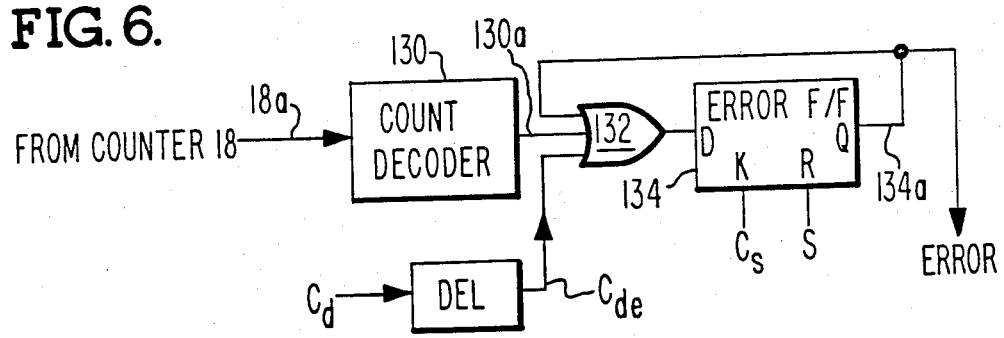
FIG. 7.
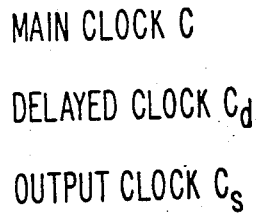
MAIN CLOCK C
DELAYED CLOCK $C_d$
OUTPUT CLOCK $C_s$
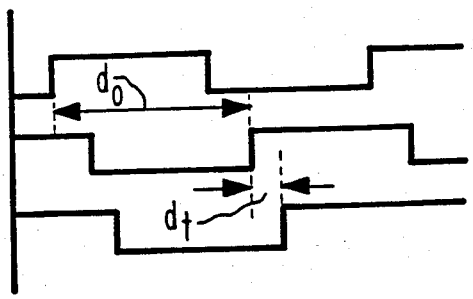

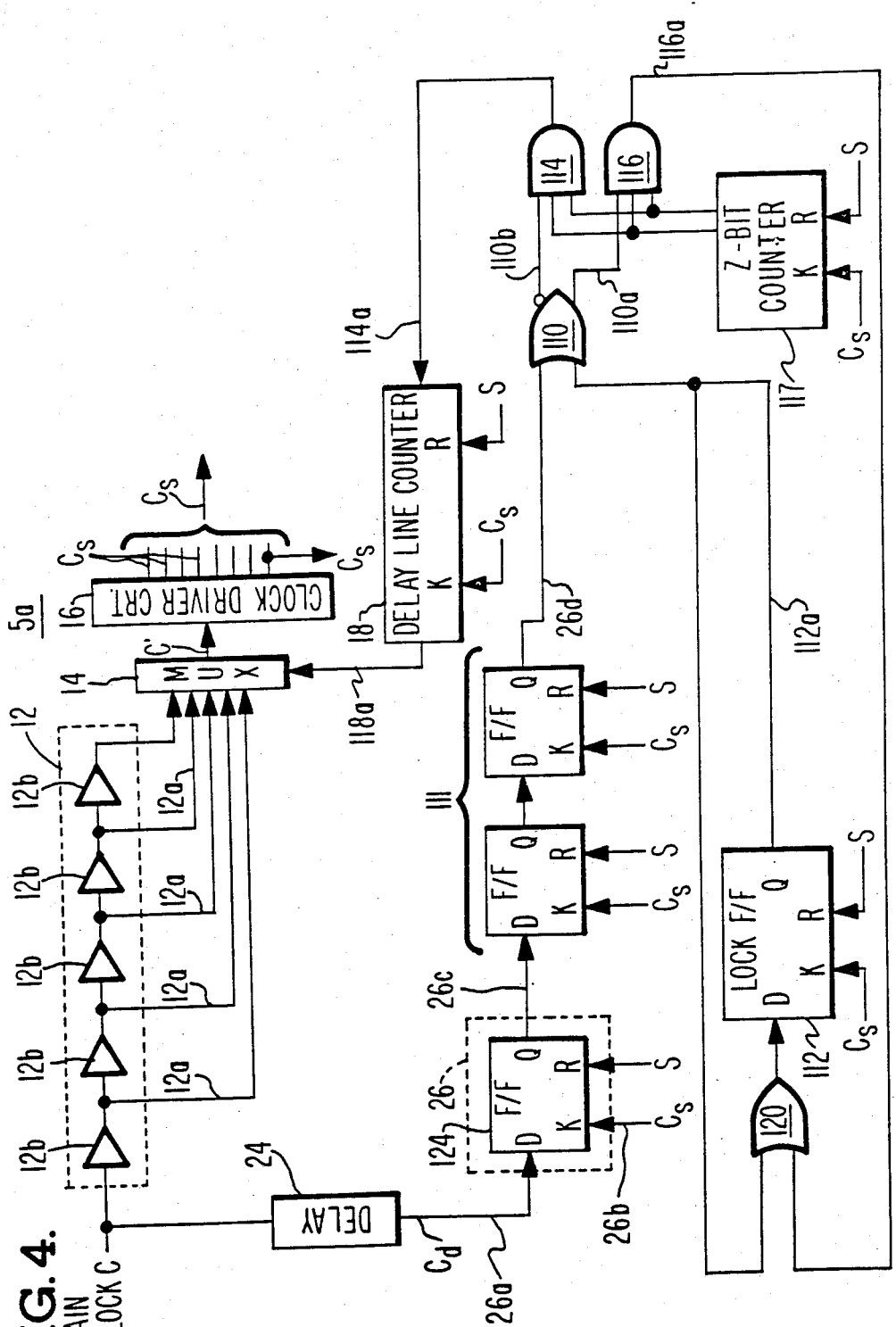

AUTOMATIC SIGNAL DELAY ADJUSTMENT METHOD

CROSS REFERENCE TO A RELATED PATENT APPLICATION

This application contains subject matter related to our concurrently filed commonly assigned patent application Ser. No. 645,935 for Automatic Signal Delay Adjustment Apparatus, same inventors.

BACKGROUND OF THE INVENTION

This invention relates generally to data processing systems and more particularly to improved means and methods for overcoming the deleterious effects of propagation time variations in a synchronous digital data processing system.

A particular problem which is caused by propagation time variations in a synchronous data processing system occurs in connection with the design of a clock distribution system. For example, propagation time variations can produce significant skewing of the clocks applied to different parts of the system. In order to prevent this skewing from creating timing problems, a conventional solution is to add the maximum skew to the minimum system cycle time so as to thereby guarantee that all data signals arrive at their destination storage elements (e.g., flip-flops) before the clock does. In today's high performance systems (either computers or other systems designed using digital devices), this increase in cycle time can have a significant deleterious effect on system speed.

A primary cause of skew in a data processing system is a result of propagation time variations which occur between integrated circuit chips due to manufacturing process tolerances. This is a particularly sensitive problem in the case of clock distribution circuitry, since inter-chip propagation time delays will produce skews in the clocks distributed throughout the system.

One solution to the skew problem is to improve chip fabrication processes to make chips more uniform so that tolerances from chip-to-chip are smaller. However, the increased cost that would be involved makes this solution economically impractical.

Another type of solution which has been employed to minimize skew is to provide for manual (or operator-controlled) adjustment of the clock distribution system, such as disclosed for example in U.S. Pat. No. 4,447,870 for "APPARATUS FOR SETTING THE BASIC CLOCK TIMING IN A DATA PROCESSING SYSTEM", issued May 8, 1944, S. A. Tague, et al., inventors. Besides the inconvenience of having to provide manual or operator-controlled adjustment, this solution is also expensive because of the increased labor and/or set-up which would be required.

It is to be noted that clock skew can also present problems in connection with communication receiver circuitry where signals may be received at times which are not properly in phase with a system clock. Special synchronizing techniques have been developed for handling asynchronous received signals, such as disclosed, for example, in U.S. Pat. No. 3,908,084 for "HIGH FREQUENCY CHARACTER RECEIVER" issued Sept. 23, 1975, P. R. Wiley, inventor. However, because of the different factors involved, such techniques are not appropriate for solving the inter-chip propagation time variation problem to which the present invention is directed.

SUMMARY OF THE PRESENT INVENTION

A broad object of the present invention is to provide improved means and methods for reducing problems caused by propagation time differences in a data processing system.

A more specific object of the invention is to provide improved means and methods for significantly reducing inter-chip skew in a digital data processing system.

Another object of the invention is to provide improved means and methods for significantly reducing skew in the clocks provided by a clock distribution system.

Another object of the invention is to provide improved means and methods in accordance with one or more of the foregoing objects for significantly reducing skew in a relatively simple and economical manner without requiring hand or operator-controlled adjustment.

A further object of the invention in accordance with one or more of the foregoing objects is to provide improved means and methods for reducing skew which can be implemented with most known logic families.

A still further object of the invention in accordance with one or more of the foregoing objects is to provide means and methods for reducing skew which is particularly well suited for use in VLSI (very large scale integration) technology.

In a particular preferred embodiment of the invention, the above objects are accomplished by providing automatic clock de-skewing circuitry for each of a plurality of clock distribution chips. In a preferred implementation, this automatic clock de-skewing circuitry employs feedback circuitry including a multi-tapped delay line and an accurate constant delay for automatically adjusting the chip propagation delay of each clock distribution chip to provide substantially the same constant predetermined delay relative to the main-system clock for the output clocks provided by the clock distribution system.

The specific nature of the invention as well as other objects, advantages, uses and features thereof will become evident from the following description in conjunction with the accompanying drawings.

BRIEF DESCRIPTION OF THE DRAWINGS

FIGS. 3A and 3B comprise timing graphs illustrating the overall operation of the clock distribution chip 5a of FIG. 2.

FIG. 4 is an electrical block diagram illustrating a more specific implementation of the clock distribution chip 5a illustrated in FIG. 2.

FIG. 6 is an electrical block diagram illustrating how error checking may additionally be provided for the implementation of FIG. 4.

FIG. 7 comprises timing graphs illustrating the operation of FIG. 6.

DETAILED DESCRIPTION OF THE INVENTION

Like numerals and characters designate like elements throughout the drawings.

Figure 1:
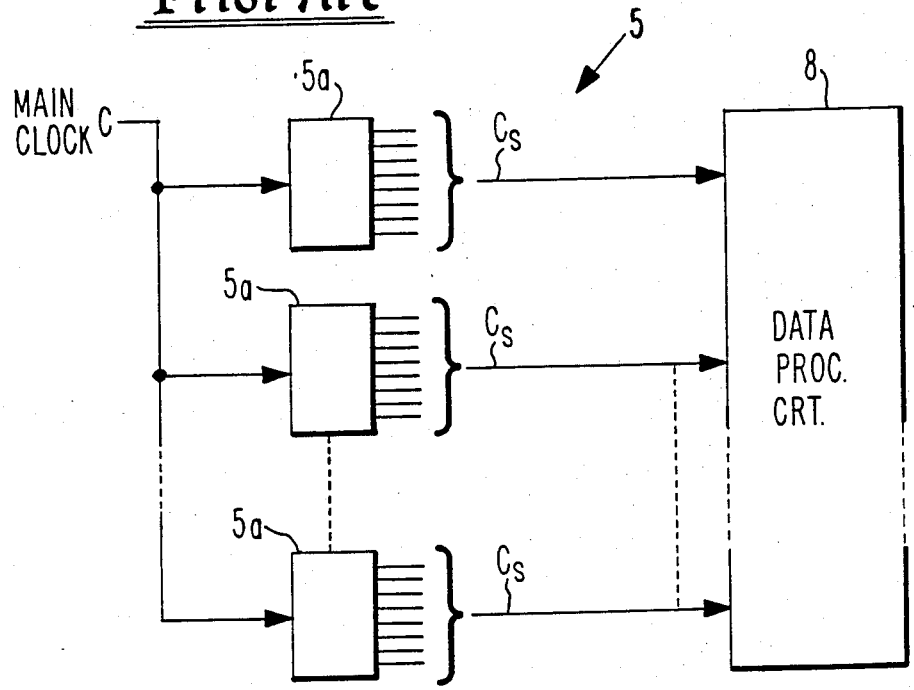
FIG. 1 is an electrical block diagram generally illustrating a conventional clock distribution system.

Referring initially to FIG. 1, illustrated therein is a clock distribution system 5 employing a plurality of clock distribution chips 5a responsive to a main clock C for distributing clock signals $C_s$ to data processing circuitry 8 in a conventional manner. As pointed out previously herein, it is important that the distributed clock signals $C_s$ from all chips 5a be substantially synchronized with one another (i.e., have substantially the same constant delay relative to the main clock C) so that the system cycle time does not have to be lengthened to accommodate skew variations.

Figure 2:
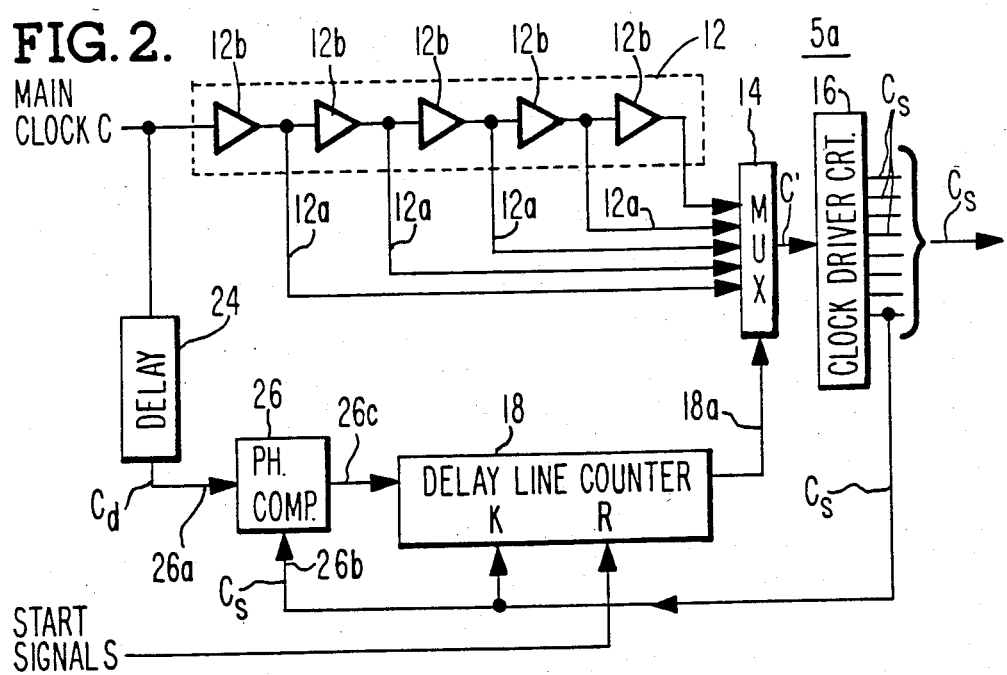
FIG. 2 is an electrical block diagram illustrating a preferred implementation of a clock distribution chip 5a in FIG. 1 in accordance with the invention.

Referring next to FIG. 2, illustrated therein is a particular preferred implementation of a clock distribution chip 5a in FIG. 1 incorporating means for automatically adjusting the relative delay between an output clock $C_s$ and the main system clock C to a desired constant value. It is to be understood that the other chips 5a shown in FIG. 1 are preferably implemented in a like manner so that all of the resulting distributed clock signals C applied to the data processing circuitry 8 may be adjusted to provide substantially the same constant delay relative to the main clock C, thereby substantially eliminating any skew therebetween.

The preferred implementation of the clock distribution chip 5a shown in FIG. 2 will now be considered in more detail. As shown, a main clock C is applied to a multi-tapped delay line 12 which provides a plurality of outputs 12a having successively larger delays relative to the main clock C depending upon their location along the multi-tapped delay line 12. As shown, the multi-tapped delay line 12 may, for example, comprise a string of gates 12b.

The delay line outputs 12a in FIG. 2 are applied to a multiplexor 14 which selects a particular one of the outputs 12a as determined by a count output 18a applied thereto from a delay line counter 18. The resulting selected clock C' appearing at the output of the multiplexor 14 is applied to conventional clock driver circuitry 16 located on the same chip for producing the output clock signals $C_s$ to be distributed to the data processing circuitry 8 (FIG. 1). Since in the preferred embodiment the clock driving circuitry 16 is all on the same chip, negligible skew occurs among the output clock signals $C_s$ and they may therefore be assumed to have substantially the same constant delay relative to the main clock C. However, clock signals $C_s$ produced by other ones of the chips 5a in FIG. 1 can be expected to have significantly different delays relative to the main clock C because of chip-to-chip variations. The manner in which the preferred embodiment of FIG. 2 being described provides for automatically obtaining a substantially constant clock delay for the clock signals $C_s$ produced by all of the chips 5a in FIG. 1 will become evident as the description of FIG. 2 progresses.

It will be seen in FIG. 2 that, besides being applied to the multi-tapped delay line 12, the main clock C is also applied to an accurate fixed delay 24 which produces a delayed clock signal $C_d$ having a delay $d_0$ relative to the main clock C. This delayed clock signal $C_d$ is applied to one input 26a of a phase comparator 26 while a representative output clock signal $C_s$ from the clock driver circuitry 16 is fed back to the other phase comparator input 26b. Basically, operation of the preferred clock distribution chip 5a in FIG. 2 is caused to be such that, each time the phase comparator 26 detects that the clock signals $C_d$ and $C_s$ have different delays relative to the main clock C (as illustrated for example by d in FIG. 3A), a count signal is caused to be produced at the phase comparator output 26c. This count signal causes the counter 18 to count (from an initial count set by a start signal S applied to the counter reset input R) until the count output 18a reaches a count such that the output 12a selected by the multiplexor 14 produces an output clock signal $C_s$ having substantially the same delay $d_0$ relative to the main clock C as the delayed clock $C_d$ (as illustrated for example in FIG. 3B), at which time the count signal is removed so that the then existing delay $d_0$ provided for $C_s$ relative to the main clock C remains constant.

Thus, the circuit of FIG. 2 will have automatically been adjusted to provide output clock signals $C_s$ having an accurate delay relative to the main clock C, as determined by the accurate delay 24. Since all of the clock distribution chips 5a in FIG. 1 can be designed in a like manner, the clock signals $C_s$ from all of the chips 5a of the clock distribution system can automatically be provided with substantially the same delay relative to the main clock C in this advantageous manner, which may be accomplished for example during power-on initialization.

An advantage of the preferred embodiment illustrated in FIG. 2 is that the accurate delay 24 may simply and economically be implemented using a known length of wire or microstrip. In addition, the string of gates 12b used for the multi-tapped delay line 12 may also be simply and economically implemented. Although the accuracy obtained using such a string of gates 12b is poor, there is no deleterious effect on circuit performance, since inaccuracies will automatically be tuned out by the feedback action.

Referring next to FIG. 4, illustrated therein is a more specific preferred embodiment of a chip 5a in FIG. 1. Components which perform functions similar to those which have already been considered in connection with FIG. 2 have been given the same designations. Also, components in FIG. 4 which are not specifically shown in FIG. 2 have been given numbers greater than 100.

As in FIG. 2, the main clock C in FIG. 4 is applied to the multi-tapped delay line 12 whose outputs 12a are in turn applied to the multiplexor 14 which operates in response to the count output 18a provided by the counter 18 to select a particular one of these outputs 12a for application to the clock driver circuitry 14 for producing the output clock signals $C_s$.

Also as in FIG. 2, the main clock C in FIG. 4 is applied, via the accurate delay 24, to the phase comparator input 26a, while a representative output clock signal $C_s$ from the clock driver circuitry 16 is applied to the other phase comparator input 26b. FIG. 4 shows that this phase comparator 24 may typically comprise a flip-flop 124 wherein the flip-flop input D serves as the phase comparator input 26a to which the delayed clock signal $C_d$ is applied, wherein the flip-flop clock input K serves as the phase comparator input 26b to which the output clock signal $C_s$ is applied, and wherein the flip-flop output Q serves as the phase comparator output 26c. As will be noted in FIG. 4, the clock signal $C_s$ is used as the clock applied to the clock inputs K of the clocked components (such as counter 18 and flip-flop 124) while the start signal S (provided for example during power-up initialization) is applied to the reset inputs R of these components for resetting them to desired initial states.

Figure 5:
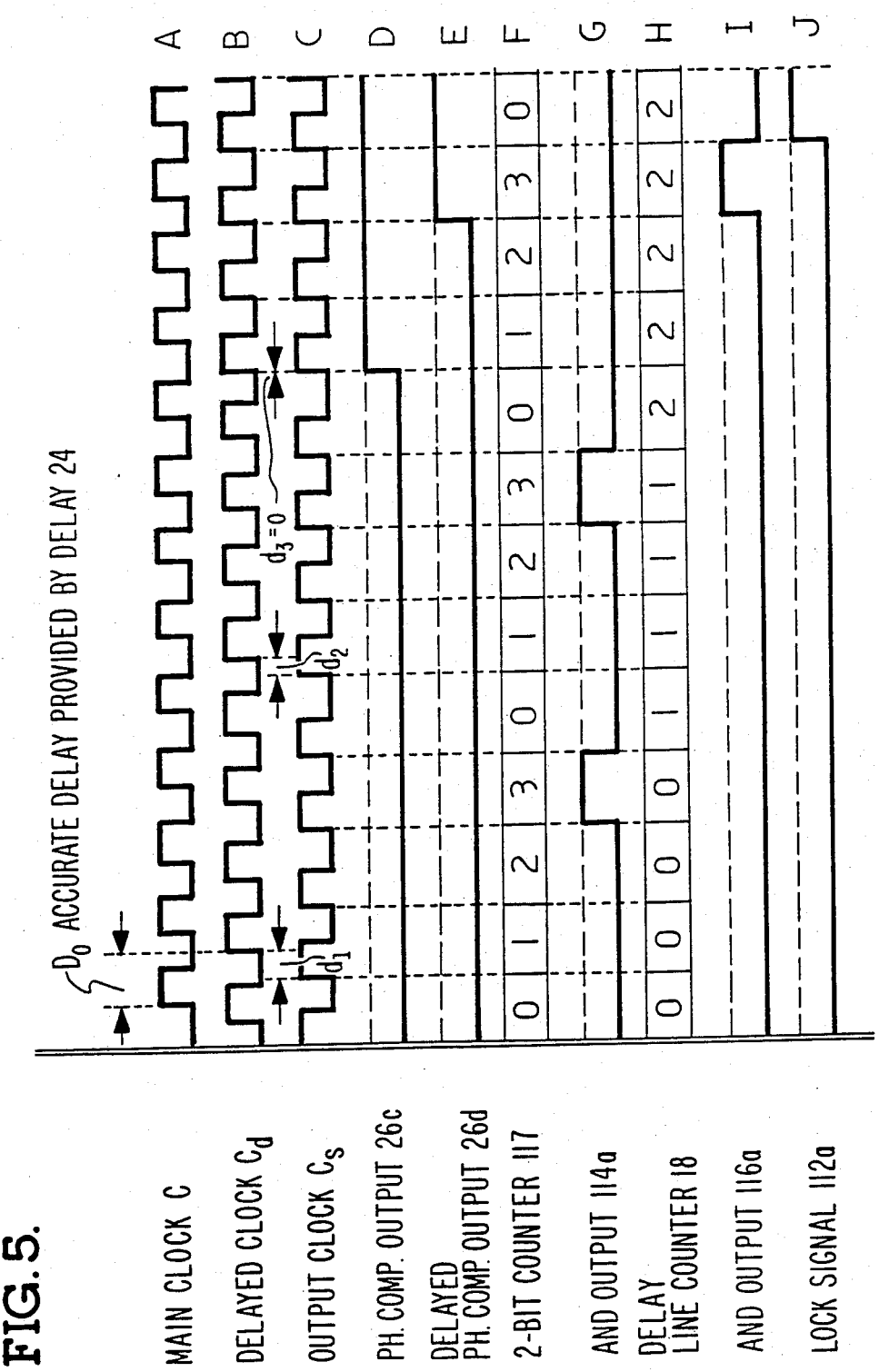
FIG. 5 comprises timing graphs illustrating operation of the implementation of FIG. 4 for a specific example of automatic clock delay adjustment in accordance with the invention.

FIG. 5 illustrates typical graphs for the main clock C, the delayed clock $C_d$, the output clock C, the phase comparator output 26c and other pertinent outputs in the embodiment of FIG. 4 during a typical example of automatic clock delay adjustment. For greater clarity, the waveforms shown in FIG. 5 as well as those shown in FIGS. 3A, 3B and 7 are illustrated in idealized form.

As illustrated in FIG. 4, the phase comparator output 26c (Graph D in FIG. 5) is applied to an OR gate 110 via a string of two flip-flops 111 which provide a two-clock delayed phase comparator signal 26d (Graph E). The use of this string of flip-flops 111 is advantageous in that it reduces meta-stability problems in the logic following thereafter. If at the rise of the clock $C_s$ (Graph C) the delayed clock $C_d$ (Graph B) is low because the delay of $C_s$ relative to the main clock C does not equal that of $C_d$ as indicated by $d_1$ in Graph C (see also FIG. 3A), then the phase comparator output 26c (Graph D) will also be low. Since this phase comparator output signal 26c is applied to the string comprised of the two flip-flops 111, the delayed phase comparator output signal 26d (Graph E) will correspond to that of the phase comparator output signal 26c two clock periods earlier.

As shown in FIG. 4, the delayed phase comparator output signal 26d (Graph E) is applied to an input of an OR gate 110, while a lock flip-flop 112 applies a lock signal 112a (which is initially set to a low value) to another input of the OR gate 110. The OR gate 110 has two outputs, an OR output 110a and an inverse OR output 110b. Thus, when the phase comparator output signal 26c (Graph D) is low, the OR output 110a will be low while the inverse OR output 110b will be high, and vice versa, when the phase comparator output signal 26c is high.

Still with reference to FIG. 4, the inverse OR output 110b is applied to an input of an AND gate 114 while the OR output 110a is applied to an input of an AND gate 116. Applied to two other inputs of each of the AND gates 114 and 116 are the outputs 117a and 117b of a 2-bit counter 117 whose four counts (0, 1, 2 and 3) are illustrated in Graph F of FIG. 5. It will be understood that the logic performed by OR gate 110 and AND gates 114 and 116 in conjunction with the 2-bit counter 117 is such that, each time the count of the 2-bit counter 117 reaches 3, the AND gates 114 and 116 will be enabled since at the count of 3 both counter outputs 117a and 117b will be high. Thus, each time the AND gates 114 and 116 are enabled (as a result of the counter 117 reaching the count of 3), the AND gate output 114a (Graph G) will correspond to the state of the inverse OR output 110b, which in turn corresponds to the inverse of the current state of the delayed phase comparator output signal 26d (Graph E), while the AND gate output 116a (Graph H) will correspond to the current state of the OR output 110a, which in turn corresponds to the state of the lock signal 112a.

As will be understood from the example illustrated in FIG. 5, when the 2-bit counter 117 (Graph F) first reaches a count of 3 (causing AND gates 114 and 116 to be enabled), the delayed phase comparator output 26d (Graph E) will be low since the delay of the output clock $C_s$ (Graph C) is less than that of the delayed clock $C_d$ (as indicated by the delay difference $d_1$ in Graph C). As a result, the resulting high level appearing at the inverse OR output 110b will cause the AND output 114a (Graph G) to become high during count 3 of the two-bit counter 117 (Graph F), which in turn will cause the delay line counter 18 (Graph H) to advance from its initial count 0 to count 1, causing the multiplexor 14 to select the next greater delay line tap 12a. This increases the delay of $C_s$ such that a reduced delay difference $d_2$ (Graph C) is obtained between $C_s$ and $C_d$. Since the OR output 110a will be low during count 3 of the 2-bit counter 117, the AND gate output 116a (Graph I) will also be false so that, when applied via an OR gate 120 to the data input D of the lock flip-flop 112, the lock flip-flop output 112a (Graph I in FIG. 5) will remain low.

When the two-bit counter 117 (Graph F in FIG. 5) reaches count 3 for the second time, the delayed phase comparator output (Graph E) will still be low because of the remaining delay difference $d_2$ (Graph C) between $C_s$ and $C_d$. Thus, as described for the previous arrival of the 2-bit counter 117 at count 3 (Graph F), the AND output 114a will again become high to now advance the delay line counter 18 (Graph H) to count 2 while the lock flip-flop output 112a again remains low.

For the particular example illustrated in FIG. 5, it is assumed that the advance of the delay line counter 18 to its second count causes the delay of $C_s$ to be increased so that the delay of $C_s$ relative to the main clock C (Graph A) is substantially equal to the delay of $C_d$ relative to C, as indicated by the $d_3=0$ designation in Graph C of FIG. 5. As a result of having achieved this match between $C_s$ and $C_d$, the phase comparator output 26a now becomes high, as shown in Graph D of FIG. 5, which in turn causes the delayed phase comparator output 26d (Graph E) to become high two clock periods later, which period corresponds to the third arrival of the 2-bit counter 117 at count 3 (Graph F). Thus, during this third occurrence of count 3 of the two-bit counter 117, the AND output 114a (Graph G) will now be low while the AND output 116a (Graph H) will become high (Graph I) and pass via OR gate 120 to the input of the lock flip-flop 112 so as to also set the lock signal 112a high as shown in Graph J.

It will be understood that when the lock signal 112a becomes high as just described, it will be locked in this high setting because the lock signal 112a is fed back via OR gate 120 to the data input of the lock flip-flop 112. It will also be understood that since the lock signal 112a is also applied to OR gate 110, this locked in high level of the lock signal 112a will thereafter cause a low level output to be applied to AND gate 114 to prevent its being enabled. Thus, any further advancement of the delay line counter 18 is prevented, thereby locking in the desired matched relationship between $C_d$ and $C_s$. It will be noted in this regard that the 2-bit counter 117 is advantageous in that it provides for alternating between detecting the phase difference between $C_d$ and $C_s$ and advancing the counter 18, thereby facilitating the locking in of the desired matched relationship between $C_s$ and $C_d$.

FIG. 6 illustrates how error checking may additionally be provided for the implementation of FIG. 4. Two types of error checking are illustrated in FIG. 6. First, a counter decoder 130 is provided to which the count of the delay line counter 18 in FIG. 2 is applied. The decoder 130 is constructed and arranged in a conventional manner to provide a high output signal 130a via an OR gate 132 to the data input D of an error flip-flop 134. If the count of the delay line counter 18 advances beyond a predetermined maximum count (indicating that the delay required to be added to $C_s$ in order to match $C_d$ is greater than can be provided by the delay line 12), the decoder output 130a becomes high to set the error flip-flop 134 so as to thereby set the error flip-flop output 134a high, indicating an error.

A second type of error checking illustrated in FIG. 6 is provided by applying the delayed clock signal $C_d$ to the error flip-flop 134 (via the OR gate 132) to an error check delay circuit 136 which produces an additionally delayed clock signal $C_{de}$. Graphs A, B and C in FIG. 7 illustrate typical waveforms for C, $C_d$ and $C_{de}$, respectively. It will be understood that if, as illustrated by d+ in FIG. 7, the delay of $C_s$ relative to the main clock C is greater than $C_{de}$ (in which case no proper match can be obtained between $C_s$ and $C_d$), then the error flip-flop 134 will be set (since both $C_s$ and $C_{de}$ will be high) to set the error flip-flop output 134a high to indicate an error. Once set, the error flip-flop 134 remains set since the error flip-flop output 134a is fed back via OR gate 132 to the data input D of the error flip-flop 134.

Although the present invention has been described with reference to particular preferred embodiments, it is to be understood that various modifications in construction, arrangement and use are possible without departing from the true scope and spirit of the present invention. For example, the invention disclosed herein is also applicable for deskewing or controlling the delay provided between other types of signals as well as clock signals. Accordingly, the present invention is to be considered as encompassing all possible modifications and variations coming within the scope of the appended claims.

What is claimed is:

1. A method for automatically providing a desired propagation delay between an input signal and an output signal produced by an electrical circuit in response thereto, said method comprising the steps of:
producing in response to said input signal a plurality of delayed signals having different delays relative to said input signal;
selecting one of said delayed signals for application to said circuit;
comparing the time relationship between a first signal derived from said output signal and a second signal derived from said input signal for determining whether the propagation delay provided by a selected delayed signal is substantially equal to said desired propagation delay;
automatically selecting a different delayed signal if the propagation delay provided by a currently selected delayed signal is determined not to be substantially equal to said desired propagation delay;
repeating the steps of comparing and automatically selecting until a currently selected delayed signal is determined to provide substantially said desired propagation delay; and
preventing selection of a different delayed signal when the currently selected delayed signal is determined to provide a propagation delay which is substantially equal to said desired propagation delay.

2. The invention in accordance with claim 1, wherein the step of preventing includes locking-in selection of a selected input signal when it is determined to provide a propagation delay which is substantially equal to said desired propagation delay.

3. The invention in accordance with claim 1, wherein said second signal is derived by delaying said input signal by a predetermined amount chosen based on said desired propagation delay.

4. The invention in accordance with claim 1, wherein the step of automatically selecting includes changing the count of a counter in response to the step of comparing determining that the currently selected delayed signal does not provide said desired propagation delay and selecting another delayed signal for application to said circuit dependent upon the count of said counter.

5. The invention in accordance with claim 4, wherein said changing occurs in a manner so that each change of count increases the propagation delay provided by the selected delayed signal.

6. The invention in accordance with claim 5, including the step of setting said counter to an initial count prior to application of a selected input signal to said circuit.

7. The invention in accordance with claim 5, wherein said second signal is derived by delaying said input signal by an accurate predetermined delay chosen based on said desired propagation delay.

8. The invention in accordance with claim 7, including the step of preventing further change of said counter in response to said comparing determining that a currently selected delayed signal provides a propagation delay which is substantially equal to said desired propagation delay.

9. The invention in accordance with claim 8, wherein the step of preventing includes locking-in selection of a delayed input signal when it is determined to provide a propagation delay which is substantially equal to said desired propagation delay.

10. The invention in accordance with claim 7, wherein said method is employed for providing each of a plurality of said circuits with a propagation delay which is substantially equal to said desired propagation delay.

11. The invention in accordance with claim 10, wherein said circuits are clock distribution circuits.

12. The invention in accordance with claim 10, wherein each of said circuits is implemented on a different integrated circuit chip.

13. The invention in accordance with claim 12, wherein said method includes providing circuitry on each chip for implementing the steps of producing, selecting, comparing, automatically selecting and repeating.

14. The invention in accordance with claim 5, including the step of producing an error indication when the counter changes to a predetermined count.

15. The invention in accordance with claim 5, including the step of producing an error indication when none of said delayed signals is able to provide said desired propagation delay.

* * * * *